United States Patent [19]

Kara et al.

[11] Patent Number: 4,697,245
[45] Date of Patent: Sep. 29, 1987

[54] INSPECTION AND MEASURING APPARATUS AND METHOD

[75] Inventors: Gerald F. Kara, Gravette, Ark.; William H. Sawyer, Chester Springs, Pa.

[73] Assignee: CBIT Corporation, Malvern, Pa.

[21] Appl. No.: 676,102

[22] Filed: Nov. 29, 1984

[51] Int. Cl.⁴ .............................................. G06F 15/46
[52] U.S. Cl. .................................. 364/552; 364/507; 358/101; 358/106; 358/213.11
[58] Field of Search ............... 358/212, 213, 101, 106, 358/107; 364/551, 559, 560, 525, 507, 552

[56] References Cited

U.S. PATENT DOCUMENTS

| | | |
|---|---|---|
| 360,274 | 11/1882 | Norton-Wayne . |
| 3,667,846 | 6/1972 | Nater et al. . |
| 3,791,741 | 2/1974 | Brenholdt . |
| 3,796,492 | 3/1974 | Cullen et al. . |
| 3,919,468 | 11/1975 | Weimer .................. 358/213 |
| 4,105,925 | 8/1978 | Rossol et al. . |
| 4,111,557 | 9/1978 | Rottenkolber et al. . |
| 4,139,304 | 2/1979 | Redman et al. . |
| 4,146,926 | 3/1979 | Clerget et al. . |
| 4,279,513 | 7/1981 | Tucker . |
| 4,311,392 | 1/1982 | Yazaki et al. . |
| 4,343,553 | 8/1982 | Nakagawa et al. . |
| 4,414,566 | 11/1983 | Peyton et al. . |
| 4,433,385 | 2/1984 | De Gasperi et al. ............. 364/507 |
| 4,441,125 | 4/1984 | Parkinson ......................... 358/213 |
| 4,479,145 | 10/1984 | Azuma et al. .................... 358/101 |
| 4,509,075 | 4/1985 | Simms et al. ..................... 358/106 |
| 4,547,800 | 10/1985 | Masaki ............................. 358/101 |
| 4,581,632 | 4/1986 | Davis et al. ...................... 358/101 |
| 4,586,080 | 4/1986 | Hoyt et al. ....................... 358/101 |

FOREIGN PATENT DOCUMENTS 2454604 11/1980 France .
2100904  1/1983 United Kingdom .
2140159A 11/1984 United Kingdom .

Primary Examiner—Parshotam S. Lall
Attorney, Agent, or Firm—Connolly and Hutz

[57] ABSTRACT

A system writes computer instructions and statements for a program which operates on manufacturing apparatus to measure objects processed in the apparatus and to approve and select or reject the reviewed and measured objects in accordance with parameters established by an optical system. This optical system on sensing an inspected object forms an image on a photosensitive RAM and this information relating to the image is sorted in an electronic system. The image information, which is transmitted in bits, and the operation selects and approves objects which are detected as being within a predetermined average deviation in these dimensions.

The information on the predetermined range of dimensions is established from a representative number by the data of objects on the object edges that determine height, width and length, which data is initially sensed by the optical system, is transmitted in digital form and stored.

In the selection process bits from the sensing of the inspected object are read from the RAM and compared with stored product data. If a significant difference is detected the inspected object is rejected.

9 Claims, 12 Drawing Figures

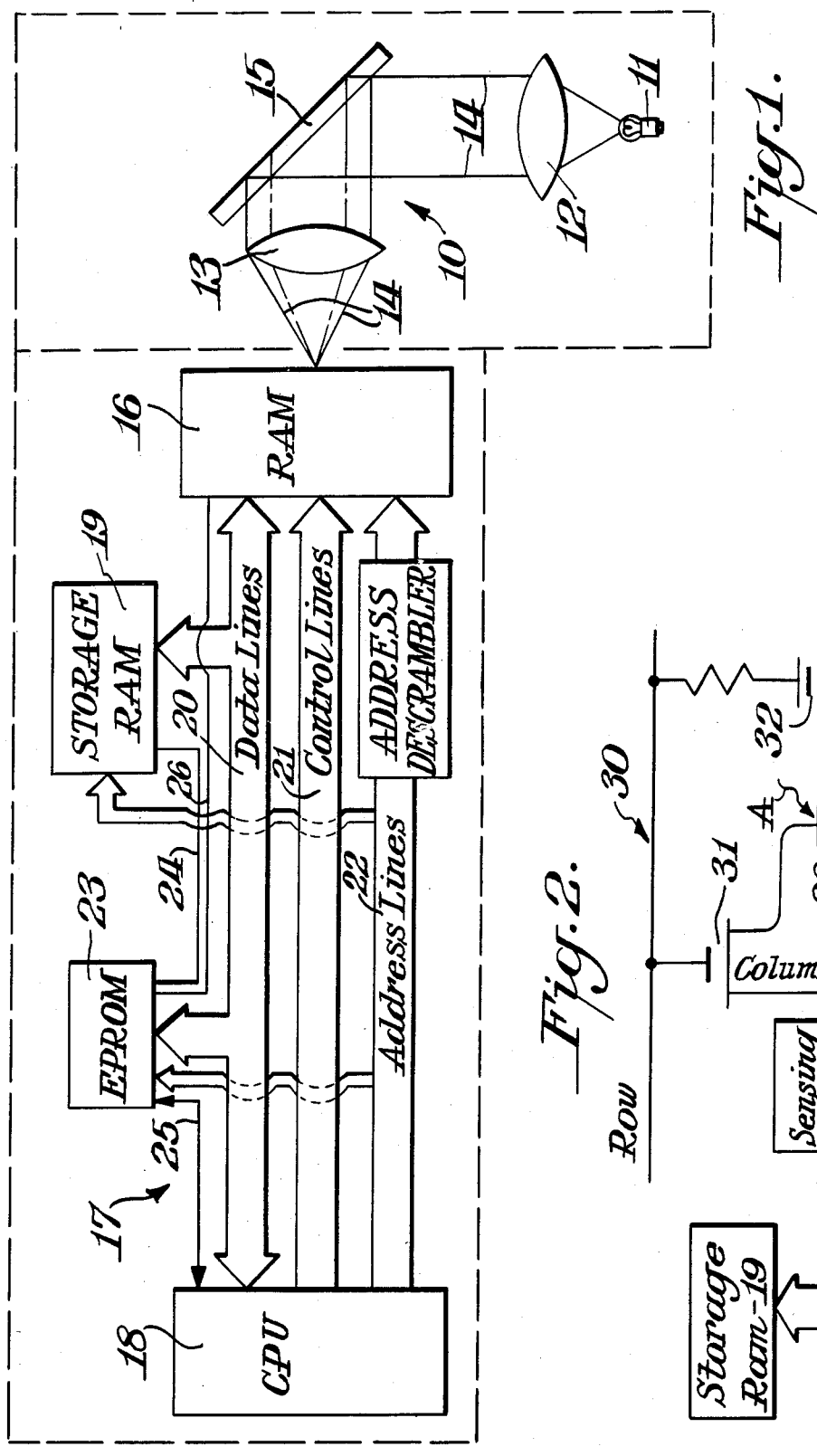

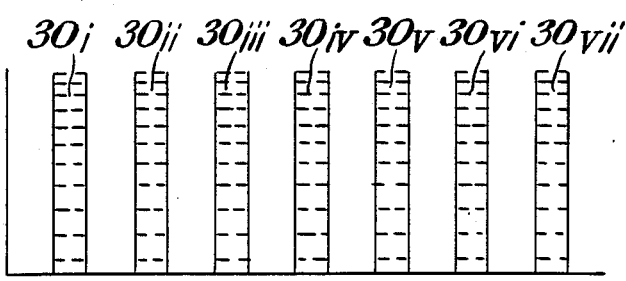
Fig.3A. Vo
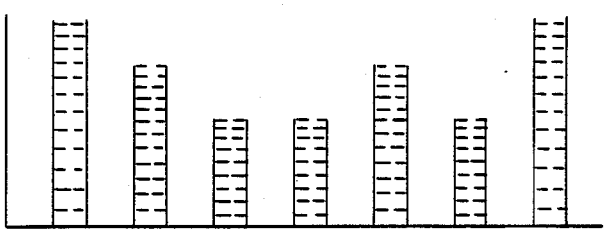
Fig.3B. Vo
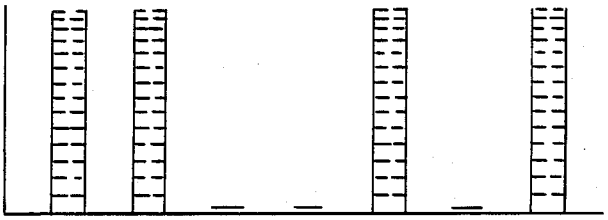
Fig.3C. Vo

Learn

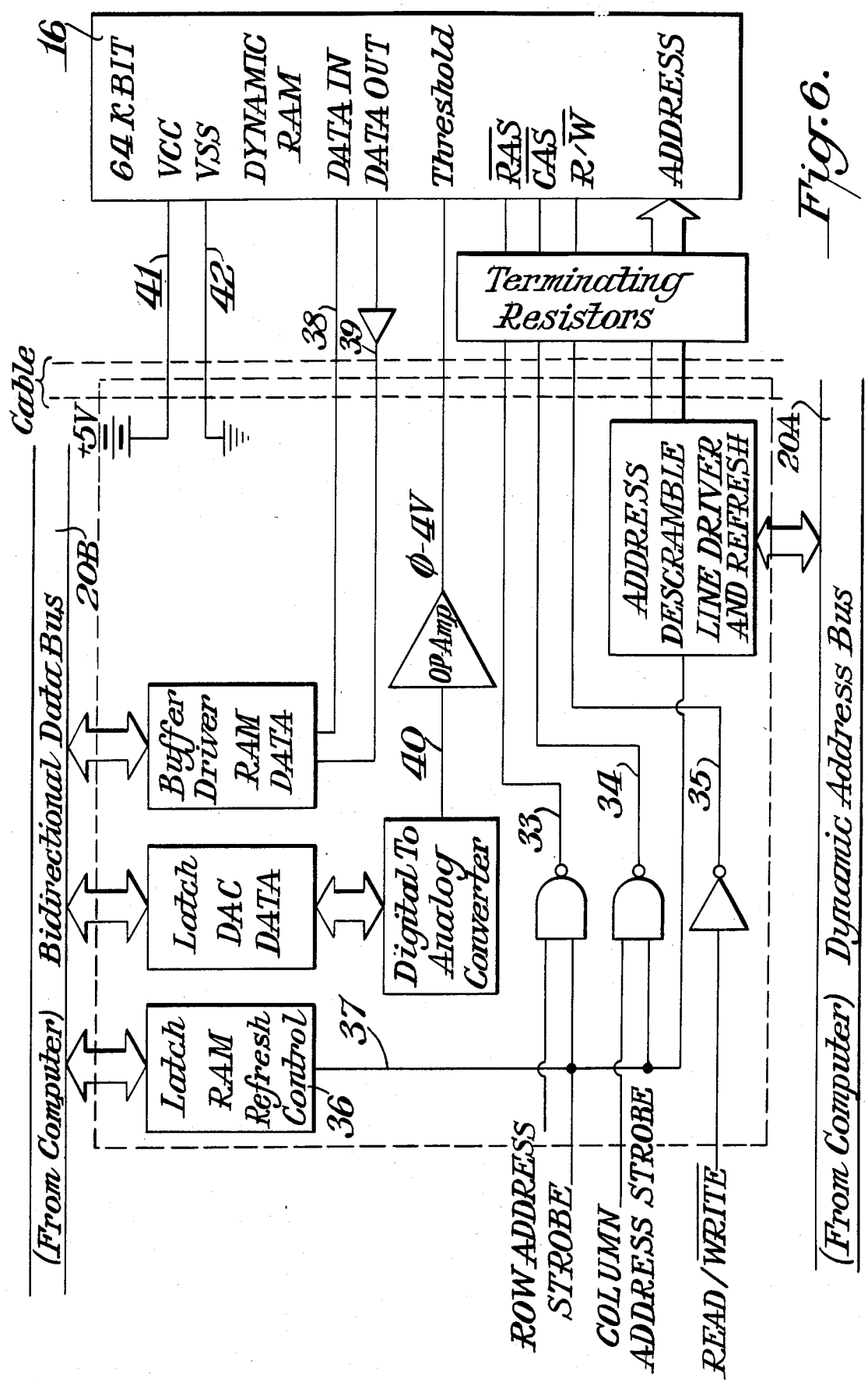

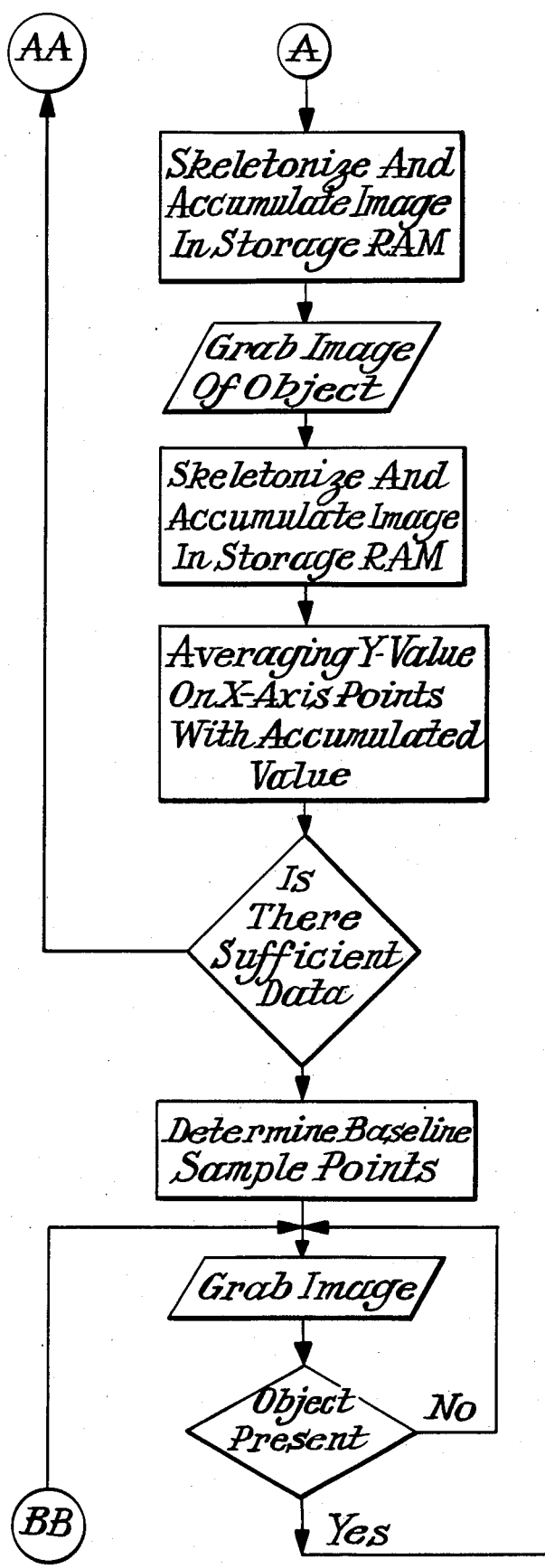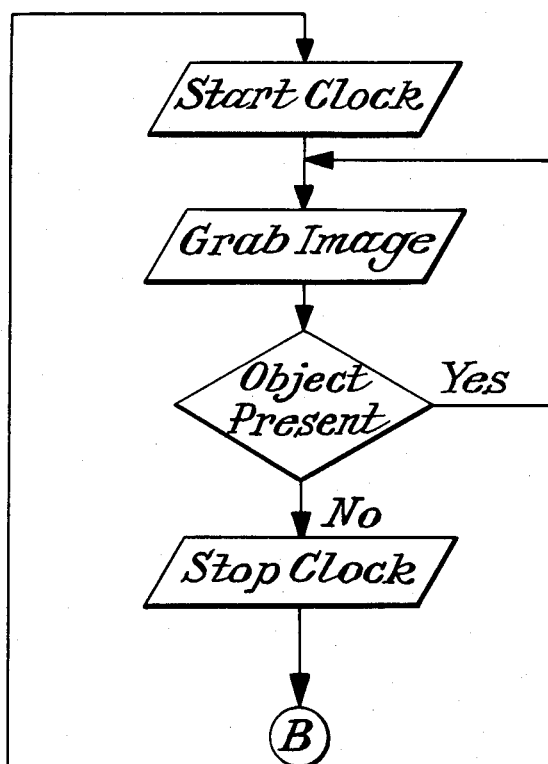
Fig. 7B.

INSPECTION AND MEASURING APPARATUS AND METHOD

BACKGROUND OF THE INVENTION

1. Field of the Invention

The present invention relates to measuring apparatus for shaped bodies and more particularly to measuring and checking articles in rapid succession Further this invention relates to the use of memory circuits of the integrated circuitry type for comparing outputs from a measuring step for the purpose of protection against incorrect body sizes, and obtaining other information

2. Description of the Prior Art

In an article measuring apparatus, a light beam is used incident on a surface and the body surfaces intercept this light beam. Various methods are used for projecting the light beam. The detection provides information about the bodies which results in data which is used in a system for calculating and comparing values and then checking on the correctness of the body characteristics.

Typical light sources are lasers, and incandescent and strobe lamps. The light beams are projected onto the surfaces at a variety of angles or directly. The detectors of the light reflected after falling on the object include the variety of known detectors such as a television-type sensing device, a vidicon, a multiple array of discrete photosensing components, or a photomultiplier tube.

The systems are provided with a variety of modes for making a determination about the object body.

BRIEF SUMMARY OF THE INVENTION

This invention involves the control by the microprocessor of the inspection of articles to establish compliance with predetermined standard dimensions.

A system for inspecting, checking and controlling the dimensions of any three dimensional object uses an optical viewing of the object in conjunction with a microprocessor. An optical system senses an inspected object to form an image. The image is produced on a photosensitive RAM chip and information relating to the image is sorted in an electronic system.

Devices of the type of an all-digital image sensing device are disclosed in the article entitled "A 64K-bit dynamic RAM chip is the visual sensor in this digital image camera" by Steve Ciarcia, BYTE, September, 1983, Vol. 8, No. 9, page 21 and October, 1983, Vol. 8, No. 10, page 67. Also reference may be had to U.S. Pat. No. 4,441,125, particularly FIG. 2, & incorporated herein.

Referring to the present invention, the image information processed and stored includes dimensional values, and the information is transmitted in bits.

The first part of the procedure involves establishing the parameters of the process. These are the standardized dimensions of the inspected articles. The establishment of the dimensional parameters is accomplished by the optical sensing of representative articles.

A succession of objects to be inspected are sensed by the optical system. Individually and successively a sectioned light image of each successive object is produced on the photosensitive RAM chip. The edges that determine the height, width and length are located and the location of the bits identifying these edges and values are directly transmitted in digital form to be stored information.

A series of these similar objects from a particular production source are thus sensed and measured and the information obtained is placed in locations in storage RAM. When a representative number of these objects has been sensed and measured the data is processed by averaging to transform the data into commands stored in the RAM for evaluating a series of the articles in an application of the program according to this invention.

This system of writing computer instructions and statements for a program has as its ultimate objective an application of the program which results in the selection and approval of articles within the range of the determined average deviation. Also the defective articles are identified and the nature of the defects noted and collated.

Stated briefly, specific bits from the sensing of an inspected article are read from the cells of the storage optic RAM and compared with the stored product data contained into the storage RAM. While this comparison is taking place, the optical system is sensing a succeeding article.

If the comparison discovers a significant difference between an inspected article and the standard, the inspected object is selected for rejection, and the amount of deviation may be noted and used for trend analysis.

The optical system involves a beam of light in a single line or grid pattern directed at and incident on the moving object on the conveyor system and transversely across the objects. Preferable the beam of light is directed at the plane at an angle of 45°. It is a feature that the setting of the angle of 45° causes the object to create a break in the line of light into two separate lines. The distance of the separation between these lines is equal to the height of the bar. This break in the lines is detected and transferred to the photosensitive RAM chip. A dynamic RAM integrated circuit chip is used as memory for a microprocessor and by permitting light to strike the die when the refresh is off, the same device becomes a photosensitive detector array for optical images. The use of this technique eliminates the need for a television camera, or working with a whole image or an analog to digital converter or the computer image processing time required to produce a binary image suitable for standard measuring algorithms.

A feature is projecting light in at least one single line, detecting a break or separation in the line into two lines and making a comparison with the separation in the image of the standard and the successive images of the moving bars on the conveyor system.

The image that is produced on the photosensitive RAM by the standard is comprised of a large number of the memory cells of the RAM. In a thinning procedure specific critical cells are identified as representing the body of the object. Further of these specifically identified cells, there are cells which are identified as located with transition points (edges) in the image of the object.

These cells at the transition points in the present embodiment contain data in the form of bits, a loss, or lack of charge or a logic "0". This information through the action of the program in the processing units is transmitted in bit form to a storage RAM where it is stored as an address table.

When the inspected objects are subsequently sensed and imaged on the photosensitive RAM, the specific cells at the transition points are discharged. This logic 0 on these few vital cells is detected and digitally read out to the storage RAM for comparison.

A significant aspect in the imaging, detection and transmission procedure involving the photosensitive dynamic RAM lies in the speed provided which in turn has a faster refresh signal to maintain the image. This refresh signal proceeding every ⅛ millisecond through the RAM keeps the data available for read out. Because of this high speed the refreshing preserves uniform exposure of the images on the RAM.

Another significant aspect of the processing of the values by digits is the tolerances that can be provided for. For example, to compensate when the correct transition points cannot be located in the imaged cells, the program signals locate and detect the cell having the data. This data is then read out of the photosensitive RAM to the storage RAM where the correct points are stored.

BRIEF SUMMARY OF THE DRAWING

FIG. 1 is a diagrammatic view of essential parts of the apparatus incorporating a photosensitive RAM according to the invention;

FIG. 2 is a circuit diagram representative of a memory cell of the photosensitive RAM;

FIGS. 3A–3C present bar charts of images on the optic RAM;

FIG. 4A without a sensed object and FIG. 4B with a sensed object reproduced on the photosensitive RAM;

FIG. 6 is a block diagram illustrating the organization associated with the photosensitive RAM and the electronic system apparatus of the invention; and FIGS. 7A, 7B and 7C are flow charts for the method of operation according to this invention.

DETAILED DESCRIPTION

Figure 4A:
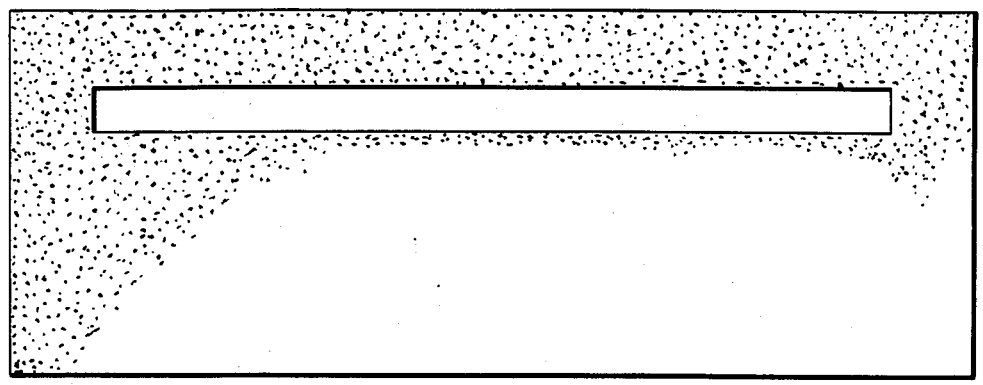
FIGS. 4A and 4B are graphic illustrations on a CRT screen.

FIG. 1 shows an embodiment of a measuring apparatus for bodies according to the invention. An optical system 10 is comprised of an object lens 13 and a source of light 11, and a condenser lens 12 which protect a light beam 14 in a pattern at and incident on an object 15. Particularly the object 15 may be in motion on a conveyor system not shown and the light beam is directed and incident on the object transversely across the object. It is a feature of this invention that the beam of light 14 is directed at a plane of the object at an angle of 45° and that therefore the setting of the angle of 45° causes the object to create a break of the line of the light beam into two separate lines. This distance of the separation of these lines is proportional to the height of the object.

The light beam and the break in the line is transferred and directed to a photosensitive RAM 16.

The RAM 16 is an integrated circuit that linearly converts light level into electrical current. It is designed as an imaging device made of memory cells. In one preferred embodiment the memory cells are arranged in a regular pattern of 256 elements in a row by 128 elements in a column. This embodiment provides 32,768 discrete imaging locations.

The RAM 16 is a memory in conjunction with a system 17. The RAM 16 acts as a detection mechanism to be described further below.

In the embodiment of the invention illustrated by and described in relation to FIG. 1, the system 17 includes a CPU (central processing unit)18, a RAM 19, which are interconnected and connected to the optic RAM 16 by a data bus 20. The CPU 18 is connected also by a control bus 21 and an address bus 22. An EPROM unit 23 is connected by the data bus 20 and the address bus 22. The EPROM interconnects with the CPU 18 by bus 24 and with storage RAM 19 by bus 25.

The image analysis with the necessary computer operations is processed in the electronic hardware of system 17. The image of the object 15 as viewed by the system 10 is retained on the photosensitive dynamic RAM 16 and is involved in the processing which is described further hereinafter. In a preferred embodiment of this invention, each of a succession of objects 15 are removed and replaced successively in the optical system 10. A feature of an inspection procedure according to this invention is that checking the inspected objects in practice involves reading only critical points of the retained image on photosensitive RAM 16. It is the critical dimensions of the inspected objects 15 that are detected and stored in the memory of RAM 19. Then these detected and stored dimensions are compared with standard dimensions of the object 15 stored in RAM 19. In this way deviations that may occur in the successive inspected objects 15 are detected. The EPROM 23 provides the programming of the initial analysis and the detection comparison, decisions and subsequent action.

The photosensitive RAM 16 is a memory related to the system 17 and acts as a detection mechanism.

The memory cells in the array can be randomly accessed. This is done by row and column address strobes. As explained below, the row address strobe first addresses a row in which a cell to be accessed is present and then the column address strobe addresses the column of the particular memory cell. The confluence of these row and address strobe makes the data available on the particular cell.

FIG. 2 is an illustrative circuit diagram of a memory cell 30 of the RAM 16. The cell 30 contains a photosensitive element 31 illustrated in FIG. 2 as an n-channel unijunction transistor. The memory cell 30 is a single transistor dynamic cell. The element 31 controls access to the storage capacitor 29. The capacitance of capacitor 29 exists between the drain of the element 31 and ground. The other contact to the drain is connected to a column of the RAM 16 array and the gate is connected to a row.

Each memory cell 30 is precharged to a fixed voltage of +5 volts. These individual cells after this charging to 5 volts are discharged by light incident on the photosensitive element 31. In FIG. 2, the incident light is represented by the broken arrow A falling on the element 31. The capacitor 29 charged to +5 volts is discharged as the element 31 photosensitivity causes a flow of current through the channel. The discharge from the +5 volts depends upon the intensity of the light during the exposure of the element to the light. As the discharge continues as long as the light falls on the element 31, the capacitor voltage can be reduced to a value below the threshold setting of the comparator.

When the capacitor voltage value has been discharged below a fixed threshold voltage, the cell will be read as not containing a logic 1 but as having a logic 0.

To read the information on memory cells 30 (FIG. 2) the column line is connected to the voltage source and then released and the row line is raised as by signal. If the capacitor 29 (FIG. 2) is at a low voltage, the result is a lowering of the voltage on the column line. This lowering of the voltage on the column line is detected by a sensing amplifier driver and the data output line is driven to 0. This is illustrated in FIG. 2.

In a particular aspect of the present invention, if the memory cells are to take a new image the cells are cleared by restoring full charge to them. Clearing or charging a row at a time of the memory cells is accomplished by reducing the threshold voltage to 0 volts and refreshing. During comparison in the reference cycle the charge on the cell capacitor can never be zero when sensed, but the threshold has been set at zero volts. Therefore, the charge on the cell capacitor must be greater than the reference value. This forces the memory cell to be refreshed to the high state resulting in clearing the cell. When the reference value is zero, it is impossible for the cell to have 0 charge. Therefore, it is forced back to full charge. The refresh cycle is accomplished with hardware, operating near the component speed limitations (optic RAM access time). This is accomplished in 128 microseconds (0.000128 seconds).

This method has two advantages. First, the normal refresh rate on the optic RAM is increased to 8 times per millisecond causing the instrument to do a better job of "freezing" the image on the optic RAM. Second, the optic RAM can be isolated from addresses generated by the processor for program execution. If it were not isolated, an effect occurs which is seen as rows or sections of the image less sensitive to light (appearing as black lines).

FIGS. 3A-3C illustrate the operations as applied to the memory cells 30 and more particularly as reflected in the voltages across the elements 31 of the cells 30. FIG. 3A illustrates the voltages on cells 30 *i* to 30 *vii* which are set at +5 by the above-described clear operation which sets all the diodes high. FIG. 3B shows the cell 30 *i-vii* in various degrees of discharge after exposure to the light image from the optical system 10. FIG. 3C shows the evaluation of the cells upon conversion to the conform to the binary code of "1"s and "0"s in relation to the threshold voltage of +2.5V.

Figure 4B:
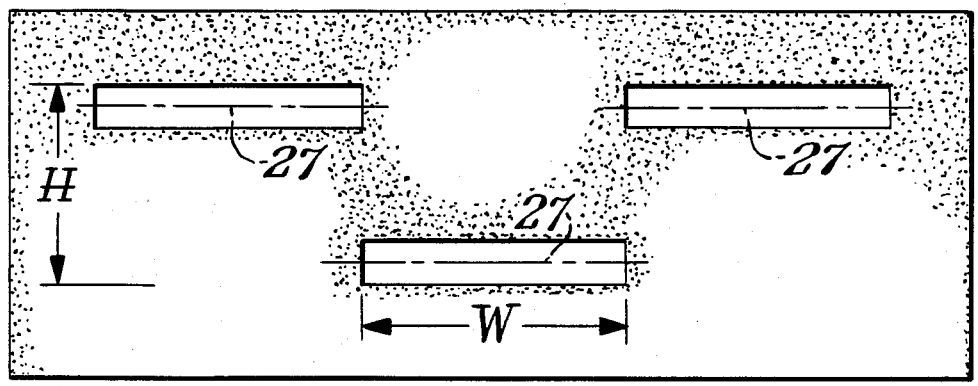

FIG. 4A is a graphic illustration on a CRT screen of representative memory cells of RAM 16. The absence of shading represents the points of the array of the RAM 16 whose relative position represent values on the X- and Y-axes which are critically relatable to a viewed object. FIG. 4B is a graphic illustration of the image produced on the cells by the incident light from the system 10 when an object 16 is sensed and its image frozen in the cells 30. These cells 30 upon which light falls, are discharged, shown in FIGS. 3A-3C lacking voltage above the threshold voltage and therefore represented by a logic 0 and in this embodiment by an absence of shading. Contrariwise, the cells upon which no light falls remaining above the threshold are represented by a logic 1 and the presence of shading. The illustration has only two shades, white and black representing logic 0 or logic 1, respectively.

Figure 5:
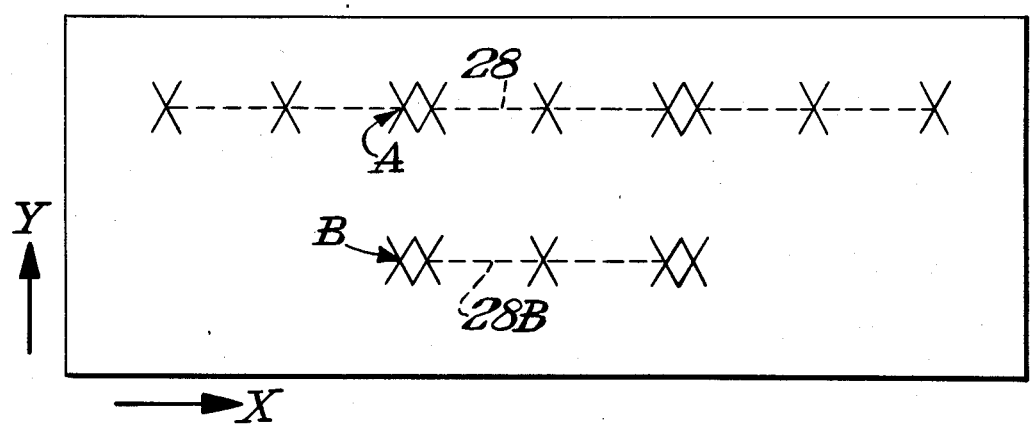
FIG. 5 is a graphic illustration on the X- and Y-axes of the photosensitive RAM of representative memory cells in the imaging of a second object.

FIG. 5 is a graphic illustration of values on the X- and Y-axis of representative memory cells at a few of the critical points determined in establishing the characteristic features of the sensed object, such as dimensions. These representative points are determined in this described preferred embodiment of the invention by a skeletonization process. This skeletonization takes place in a learning mode in which an object 15 of FIG. 1, which is a standard accurate, pre-determined dimension, is sensed in the optical system 10. The light beam 14 emitted from system 10 of FIG. 1 after sensing the standard object 15, produces an image on the cells 30 of RAM 16 of FIG. 1 which precisely defines the searched-for dimensions in charged and discharged cells 30 (FIG. 3) as shown by light and dark areas in FIG. 4B. The myriad cells 30 of the RAM 16 array comprising these light areas of FIG. 4B are resolved by skeletonization to key, critical points for the inspection procedure of the present invention described in greater length below.

By the thinning technique the binary image is sharpened. A digital logic replaces the logic 0's obtained by exposure. This thinning logic decides that a cell belongs to the thinned line when it is on the medial vertical axis of all exposed cells. The imaged cells which make up each of the unshaded areas of FIG. 4B constitute a set. The edge of the unshaded area is a boundary. A certain cell is within the set and within a circle the radius of which is the distance from the cell to the boundary. The cell is a skeletal point if there is no other circle with the same center X and a greater radius contained in the set, which touches at least two of the boundaries. The union of all skeletal points in the imaged cells is a skeleton or medial axis.

The usual idea in skeletonization or thinning is to sequentially remove the edges of the line to be thinned from storage until all that remains is a single line of bits only one bit wide.

An algorithm can be devised to define the skeletal pixels.

The base structure of the standard object 15 is looked for by means of a thin algorithm applied to the RAM 16 by transmission through bus 26 from a program in EPROM 23. This skeletonization identifies specific critical data points comprised of cells marking the center lines 27 of the involved sets as shown in FIG. 4B. Then from this sub-set the logic looks for the particular transition points. For example, from critical data points in the order of 256 points the 14 points illustrated in FIG. 5 can be located. The representative dimensions of height and width of a three dimension standard object are indicated by appropriate arrows and legend in FIG. 4B.

FIG. 6 shows a general block diagram of the circuitry of the interface with the photosensitive RAM 16. The RAM 16 is a dynamic RAM chip. As stated above in one embodiment it has a total of over 65 thousand imaging locations. Each location is a cell which is sensitive to light as explained above with reference to cell 30 illustrated by FIG. 2. Each of these elements in the matrix has a light-sensitive component. Each memory cell that can be accessed randomly by simply reading in the appropriate row and column address. Light striking a particular element causes the capacitor, which is initially precharged to a fixed voltage, to discharge toward 0 volts. The capacitor discharges at a rate proportional to the light intensity through the duration of the exposure. When the cell's content is read, a logic 0 remaining in the cell indicates a bright pixel-the capacitor was exposed to a light intensity sufficient to discharge the capacitor past the threshold point. Thus each cell is made up of an electronic unit that discharges with light by converting light levels into electrical current. The current which leaks from the cell up to a level to effect a switching is a linear function of the light intensity. Accordingly, by adjusting the calibration of the cell it is possible to predetermine the amount of light that will bring about the switching, i.e. a specified amount of light will cause the sufficient discharge of the memory cell. The operations for establishing the predetermined standard or threshold is provided from the EPROM 23.

In one embodiment the threshold voltage is established at +2.5 volts in each cell. In the Encyclopedia of Computer and Engineering, p. 953, for example, there is described the technique for use in connections with establishing the threshold voltage.

Basically, the system illustrated in FIG. 6 includes means for selecting cells in the array, writing is the term used for placing information into a memory cell with a particular row and column address. Read is the term used for retrieving information from a memory cell with a particular row and column address. After the memory cells to be addressed are prepared, the write signal writes into these cells. The read signal retrieves information from these addressed memory cells. In short, the write and read signals are delivered to and from addressed locations which are the charged or uncharged memory cells. Basically, the system 17 includes means for selecting cells in the array, means for writing data into predetermined cells and means for taking data out.

In FIG. 6, the optic RAM 16 is on the right side of the figure. According to an embodiment of this invention, one-half of the photosensitive cells are used. The transition points 28A and 28B of FIG. 5 are established in the learning mode in relation to a standard which is sensed.

Reference is made to the legends which identify what occurs in this procedure.

The bus 22 accesses the preselected cells, together with appropriate RAS, CAS, R/W lines 33, 34 and 35 provide the random access and column access strobes and read/write signals respectively.

The RAS performs a further function in conjunction with the refresh operation. Refreshing the image sensor is a process used in a dynamic memory: the existing charge in each cell is sensed, the voltage compared with a threshold potential, and a fresh potential of OV (for a logic 0) or +5 V (for 1) is rewritten into the cell. If the image sensor is not continually refreshed, the light focused on each cell causes the voltage in each cell to leak away at a rate proportional to the intensity of the light. When the image sensor is not being refreshed, it is light sensitive. Refreshing is accomplished by sequencing through all 256 rows every ⅛ millisecond. This action restores the charge. This refresh action is controlled by latch 36 provided by line 37. In this embodiment the threshold is 0.

A DATA IN line 38 transfers data into the photosensitive RAM 16. A DATA OUT line 39 transmits.

The memory cell at each image location of the RAM 16, being sensitive to light, is effected by the photodiode current which in turn means that light renders the diode conducting. The light intensity in turn determines cell discharge current and establishes the memory cell voltage level.

The data transferred by line 38 and 39 in and out of the RAM 16 is in the form of binary information or code. Each transfer is in the form of a 1 or a zero. Data read from the cell is either a 1 or a zero. In a useful operation of the apparatus a preset threshold value determines the voltage level of the cell at which the photodiode switches the cell from transferring a 1 to transferring a zero, or vice versa. The threshold is set on signals through line 40.

Under typical operating conditions the threshold value is calculated and held constant. For each cell the output data is related to whether the cell voltage is above or below the threshold.

If the memory cell voltage is above the threshold voltage, the output is a 1. If the cell voltage is less than the threshold, the output is a zero. Whether the cell voltage is less than or greater than the threshold is effected by the light directed at the semiconductor junction and the resulting current.

Further in FIG. 6, a power line 41 supplies a +5 volt potential to RAM 16 and a ground 42 is indicated.

Operation

In general the operation of the apparatus in the inspection process involves a number of steps centering around the digital image sensing device, the RAM 16. As the purpose of this process is to sense, evaluate and analyze a series of objects, the imaging of the objects by exposure of the photosensitive RAM is a step in the process. A representative imaging in cells 30 has been described and illustrated above with respect to FIGS. 2 and 3. Thus data is provided in cells 30 of RAM 16.

The first step is to clear the cells of the RAM 16 to logic 1s. Next the standard object is sensed in the optic system 10 and the image of the object is exposed on the RAM 16. The data in the cells produced by the light is read out. Using the thinning algorithm the charge on the cells defining the image is adjusted to provide charged cells of logic 1s and discharged cells of logic 0s to mark the center line of the base line cells, which circumscribing the image as established in charged and discharged cells, confine the important cells to a substantially reduced number, and to mark the important cells. Thus only the cells at the critical points of the line image or objects edge involved in the procedure. The background or interior points are ignored as not important. This skeletonization to the baseline image cuts down the number of data points from which critical data points are selected to delineate the reference image. For example, thinning may produce 256 baseline points and 32 specific points selected which forming a reference line characterize the inspected object and should be present on every qualified object. Transition points are sought and detected on the sample image. The height and length values are represented by the transition points illustrated and described in connection with FIG. 5.

The memory cells are inspected by addressing in sequence by transmitting address information on the address bus.

The program from EPROM 23 searches for the cell with data, in this case zeros, and directs that a table of addresses be established in the storage RAM. If the transmission is to an established address in the table, the inspection proceeds to the next point on the RAM 16. If the designated and established point is not identified, the program branches to an alternate point or searches for it.

Figure 7A:
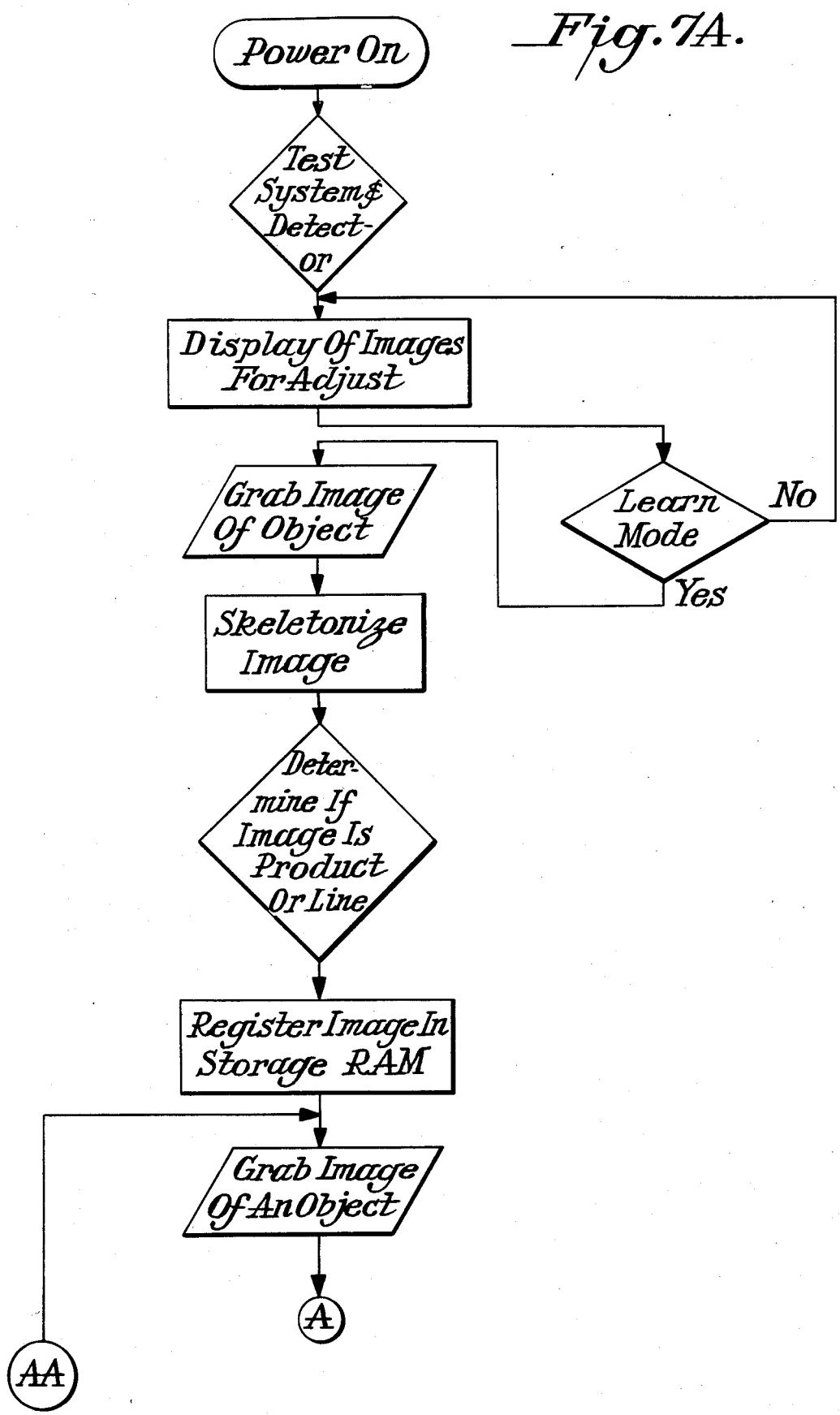
Figure 7C:
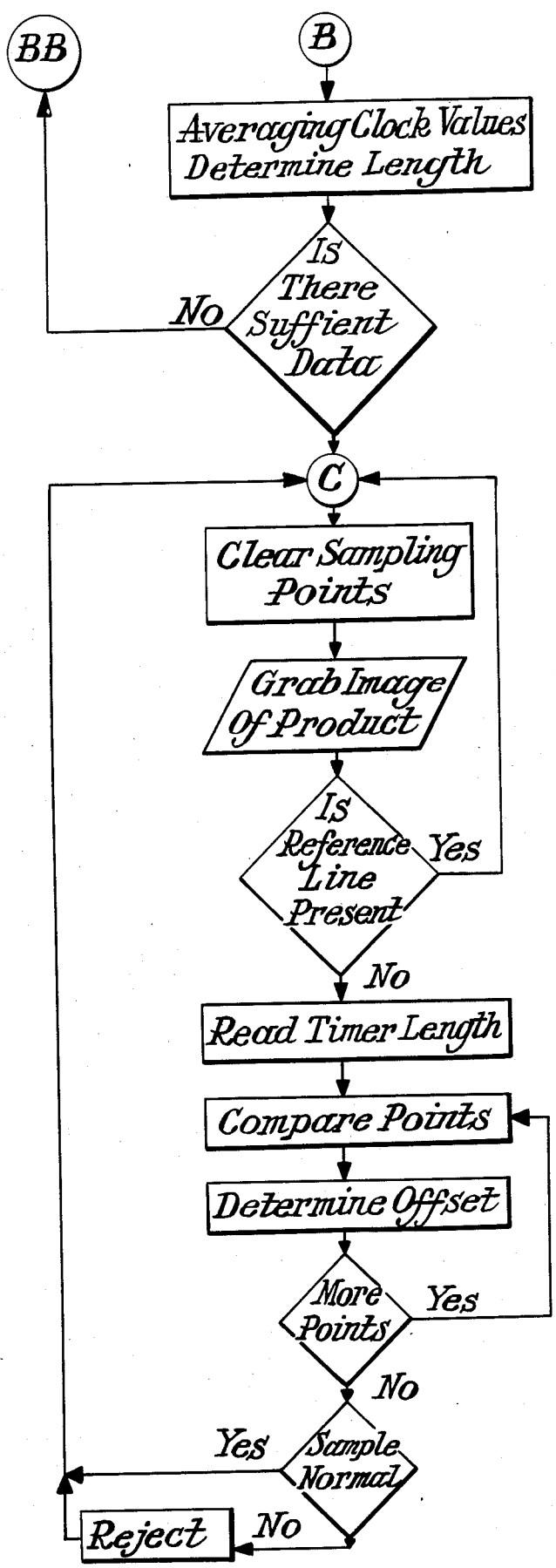

FIGS. 7A-7C show a computer program flow diagram for the system illustrated in the figures and described herein. In FIGS. 7A-7C the terminal steps are indicated with a bubble, the input/output steps indicated with parallelograms, the processing steps are indicated with rectangles whereas the decision or logic steps or questions are shown within diamond-shaped spaces.

The system is turned on. The system is subject to a test for failed components. This test is comprised of a write and reading sequence of many addresses. This write/read sequence is equivalent to a RAM memory test. In a second test all the memory pixels to be used in the optic RAM are checked by this write/read sequence. This test serves to establish the presence of all detectors. The number of detectors being used in the system is determined by the program of the EPROM.

Next, the program in the display sequencing mode, performs imaging by transferring data from the optic RAM to display memory. Each detector image is displayed for approximately a second. Thus the display mode produces on the TV monitor briefly the image scene generated on the optic RAM by the optical system. This imaging feature is employed, for example, to provide adjustment of the image focus and illumination intensity.

The display mode will proceed through all the detector images including those units of multiple optic RAMS and the system remains in this mode, sequencing through all the detector images until the program is switched to the LEARN mode.

While the learn signal has not been produced, the program will continue the display sequence successively producing the detector images.

When a learn signal is produced as by a positive actuation of a mechanical switch, the program branches to the LEARN mode.

The LEARN mode is a routine made up of instructions to determine for the apparatus the features of a proper standard product for the purpose of making a comparison of a number of manufactured products with the proper standard product.

If the program is switched to the LEARN mode, the EPROM program looks for the characteristic image on the optic RAM of an object in the optical system. A standard object of proper dimensions is positioned in the optical system. The image of this proper standard object is then grabbed by exposure of the light image to the detectors of the optic RAM. This image is then retained or frozen on the optic RAM by the refresh signal which the computer produces for the optic RAM. The image then remains frozen as long as the refresh signals continue or until the LEARN mode is completed.

In the LEARN mode, the image of a proper object is grabbed retained on the optic RAM and skeletonized by the thinning steps. The skeletonization of the image reduces the broad lines to the single pixel line image characteristic of the product as described in reference to and illustrated by FIG. 5.

The thinning may be accomplished in a standard manner, including those described in Algorithm for Graphics and Image Processing by Theo Pavlidis, Computer Science Press (1982), see pages 195 et seq. The thinning includes a way of simplifying pictorial forms.

The following refers to skeletonization. The binary image is sharpened by a thinning technique. A program in the EPROM reduces the region defining the edges of the object to a minimal cross-sectional width of a single line representing the cells of the optic RAM. The operation of the thinning algorithm is indicated by explanation set forth below.

The thinning algorithm which can be devised to provide the thinned image line for the operation in the present system looks for the base structure needed. It marks the center of these images and identifies the specific critical data points. Then from these the programmed procedures look for the transition points.

A graphic illustration of the operation of this feature is presented in a reproduction of the graph of FIG. 5. FIG. 5 shows a representation of thinned line 27 of FIG. 4B as stored in the memory of computers by the procedures described above. The positions of the stored data are indicated in the graph on X and Y coordinates. Thus the lines 28A and 28B represent the dimensions of proper object stored in the ocations in the storage memory of RAM 19 of FIG. 1. The transition point A is identified on thinned line 28A. Immediately below this thinned line 28A a skeletonized line image of a newly viewed object is illustrated by thinned line 28B. The thinned line 27 of FIG. 4B is thus shown in FIG. 5. location of the bits are stored in the RAM in a relationship which is in keeping with the pixels of the thinned line of the optic RAM 16. Accordingly the relative position on the X- and Y-axes of the optic RAM are maintained.

As a result, the line representation of the object clearly expresses the structural relationship of the object under inspection. FIGS. 4A, 4B and 5 illustrate the operation of this algorithm applied to the object under examination.

After skeletonization the thin line provides a definition of the points of the imaged object. It thus shows that given the image object we can construct the skeleton points, each of which has an associate X- and Y-value. The skeleton is obtained from the optic RAM array data. The skeletons consists of the points of the array whose relative position show values on the X- and Y- axes which are related to the viewed object.

Then this image is stored in the storage RAM. The learn routine then directs that the address information from the data of the critical points is stored into different locations in the storage RAM which have been cleared by the EPROM program for the information to be written in and stored at these locations. Then further successive images are grabbed, frozen, and skeletonized.

While image is retained on the optic RAM the skeletonization identifies the critical points by the function of the thinning algorithm.

The learn routine in the EPROM then evaluates the information from the data of the critical points to make the determination of whether the thinned image is a reference line or a product. To be a reference line the line should not exceed the limits of an unthinned line. These are illustrated in FIG. 4A, that is the maximum and minmum line are represented in FIG. 4A.

The grabbing of images and the number of images processed from the optic RAM for providing data of the critical points is a random process for attaining a good statistical result. The skeleton of the first image which is stored in the storage memory is of a proper object.

Point A of FIG. 5 is of prime significance. The skeletonizing of the first image reduces the broad lines to the single pixel line image characteristic of the product. This is illustrated in FIG. 5. Registration is referenced to the first transition point in the skeletonized line. This is Point A. When further images of successive and same objects are grabbed the program checks to determine if the image is of the product, or reference line. If not a reference, then a product, the program proceeds to find the first transition Point A. Registration of the image is carried out with respect to this Point A, or first edge.

Registration, that is establishing the registration point, occurs before accumulation of the image. Registration assumes that a previous skeletonized line image, exists in the storage RAM. This has taken place with a proper object being viewed. With the proper object, after skeletonization, the line data is stored in the storage RAM by a storing step which consists of scanning the locations of the storage RAM and reading out of the optic RAM the digital data of the memory cells carrying the line data. The Y coordinate values of the thinned line are written into the memory locations in the storage RAM.

With succeeding objects by examination the first transition point of the image of a succeeding object in relation to the stored Point A of the standard proper object, there is a justification made between the position of the first transition point of the succeeding object as it appears in the storage RAM with respect to that of the proper object stored in the storage RAM. This justification takes place by determining the difference in the positioning on the X-axis and taking this difference into account in the subsequent operation.

In the examination of succeeding objects as described above to accumulate data, the purpose is to reach a minimum variation of the standard deviation of the data. At this point sufficient data has been taken and the edges of the product images are determined.

In this reaching a minimum variation, succeeding objects are sensed and exposed on RAM 16 and the image grabbed and retained on the RAM 16. The image is skeletonized to a base line image. The X- and Y-coordinates of the skeleton are accumulated in the storage RAM. This accumulation in the register of the storage RAM 19 of the succeeding objects provides the information for determining the product edges for the subseuqent operation. This is achieved by an averaging step in which the Y values of two images of thinned lines are averaged by simple addition and division of the Y values by the program in the EPROM 23. And the averaging of successive Y values is carried out by looping a given number of times, for example five times. That is the standard deviation for each point on the X-axis is calculated after sufficient data has been obtained, the EPROM 23 program performs the averaging by looping with this data. Then the EPROM 23 puts into the storage RAM 19 the averaged points of the Y values on the points on the X-axis. Thus there is saved in the memory of the storage RAM 19 a table of standard Y values along the X-axis.

At the completion of this averaging and the resultant storage of a table of standard values the representative points provide the edges and thus the pixel addresses of the RAM 16 which are to be sampled during the run of the system.

This routine is followed to provide the vital pixels for the width, height and length of the examined product.

The routine determines the length by an elapsed time method. The length may also be measured if optical detection system 10 is rotated 90° so that the detector is perpendicular to the motion of the product. The optic RAM 16 is reset by writing 1s and then the system is exposed. Objects then moving past in the optical system 10 cause the base line image to disappear when an object reaches the base line in the image projected by the system. Thus the object is sensed and the clock values determined by a timer of its appearance and disappearance from the optical system become a means of measurement which being stored is accumulated for a number of successive objects.

As with determination of width and height two values are by simple addition and division by the EPROM 23 program. And the averaging of successive clock values is carried out by looping a given number of times. By continually taking samples, there are addition to the data to make another determination. Finally, a condition is reached when the standard deviation does not change significantly, then sufficient standard samples have been measured and sufficient data acquired. When the decision is reached that sufficient data on length has been gathered the looping is terminated and the learn mode is terminated.

The learning now being complete the NOT READY light is turned off and calculated object values can be displayed on the CRT for visualizing and recording in an appropriate log.

The RUN mode is started and the pixel points determine by the above procedure as key points are monitored. Not only the first transition point (A) but all the points on the table are checked. On the CRT these points will show the clear line when the detector is exposed to the image light. On checking for the reference line if it is present the steps of clearing and exposing is repeated and looped until the loose reference line disappears indicating a product has entered the imaging field.

As soon as the product appears, the time is noted on the clock register. This value is recorded and evaluated in relation to timing of a reappearance of the reference line.

The predetermined sample pixels are checked for the object edges. The image offset values—the X and Y pixel shift necessary to register the RAM image left edge with the corresponding edge of the standard is calculated.

The image values are compared with the standard value. The difference between the two values determines the magnitude of the error.

In comparison of the image values the EPROM 23 program obtains a location on the X- and Y- axis from the storage RAM 19 and sends a signal to the RAM 16 at that location. If it is present it moves on to the next reference point. If it is not present, it searches within a fixed arm, determined by a predetermined pattern, from example a 5 pixels dimension pattern. If it finds a location the offset value is saved and stored to remember the difference. If no location is found the sensed object is rejected. The process is repeated by branching to the point before.

Again when a product appears the sequence is repeated as described above. It is a feature of this invention that the error values are calculated. If the error is within the normal range the report so indicates, the product counter is incremented and the process is repeated.

If the error calculation indicate a product outside the nominal error values other tests may be conducted to determine the extent of the error. The first test checks for low error value and the second test checks for high error value. Each results indicate whether the product is beyond acceptable limits.

It thus can be seen that there has been provided a method and apparatus for establishing a standard of dimensions by sensing and establishing parameters and more particularly by comparing and adjusting to a succession of standard objects to reach a minimum of standard deviation by taking sufficient data. And then using this calculated standard deviation in sensing and measuring a run of articles moving successively and continuously. The moving articles thus sensed and measured and compared are identified as normal or beyond the limits.

The references, BYTE, September and October 1983, Vol. 8, Nos. 9 and 10, U.S. Pat. No. 4,441,125 and Algorithms for Graphics and Image Processing, Pavlidis, are hereby incorporated in the present disclosure.

This invention can be used on a 6502 microprocessor, which is in Apple computers and Commodore computers.

What is claimed is:

1. A method for controlling dimensions of articles as conveyance is in progress by setting dimension parameters under data processor control
   said method comprising
   viewing a plurality of articles in an optical system and successively forming images of each article,
   repetitively measuring the dimensions of the articles, entering data of the dimensions of each article
   creating and storing in a memory data of the dimension of each article,
   providing a data processor with the data of the dimensions of the articles,
   repetitively comparing the dimensions of the articles to create an average of the dimensions,
   storing data of the average of the dimensions in said memory
   monitoring conveyed articles by viewing said conveyed articles in said optical system,
   ascertaining on the basis of the monitoring of the conveyed articles whether the dimensions of said articles is in accordance with said average of the dimensions,
   halting the conveyance of an article when the dimensions thereof have failed to correspond to the average of dimensions.

2. A method for detecting abnormalities in the classifying articles in an apparatus which senses and inspects a sequence of articles, comprising:
   providing data by sensing amd measuring dimensions of a plurality of standard articles,
   storing in a storage RAM digital signals each representing critical data points of the image of the sensed article on a photosensitive RAM,
   placing an article to be inspected in an optical system to provide a second image of the inspected article on the photosensitive RAM,
   providing digital signals representing data points of the second image representing dimensions of the inspected article,
   inserting bits formed by the digital signals from the second image in the locations in the storage RAM,
   comparing the data in the stored locations with the bits from the second image,
   and determining whether or not a deviation of dimensions is within average deviation.

3. In a process controlling inspection of articles by the steps of
   inspecting the dimensions of a finished article having height, width and length by moving the articles continuously and successively through an inspection station and
   optically viewing them with incident light and reflecting light from the articles as then are moved, and
   causing a set of light-sensitive elements to produce binary inforamtion
   by providing an image of an article on a photosensitive RAM and converting the light into electrical signals in cells of the photosensitive RAM
   thinning the image on the photosensitive RAM to provide a skeletonized image of the article,
   detecting bits from the skeletonized image and storing location of the bits in a storage RAM
   inspecting successive articles, detecting and accumulating bits by providing a data processor with the binary information for computing in a central processing unit under program instructions from a programmable read only memory to establish a state and standard with a standard deviation,
   and then illuminating in incident light additional successive articles and providing images on the photosensitive RAM,
   to create a binary representation of the data of the additional articles on the photosensitive RAM,
   entering the electrical signals in said binary representation into the central processsing unit by directly reading the photosensitive RAM
   and comparing the electrical signals in said binary representation of said data from said additional successive articles with signals representative of the standard using the central processing unit
   the detected bits of the additional articles are compared with the bits of the established standard to determine a difference.

4. In the method for detecting abnormalities in classifying articles in an apparatus which senses and inspects a sequence of articles by providing an image of an article inspected in a optical system on a photosensitive RAM
   the improvement which comprises
   in a photosensitive RAM having rows and columns precharging individual cells of the photosensitive RAM to a fixed voltage a row at a time,
   selectively discharging individual cells to reduce the voltage,
   reacting the selective discharge of the cells of the photosensitive RAM by detecting the reduced voltage on the column line of the photosensitive RAM,
   in which detecting of the reduced voltage is detected in a sensing amplifier.

5. In the method for detecting as claimed in claim 4, the steps of reducing a threshold voltage on the cells the photosensitive RAM to zero,
   detecting the voltages on the image cells,
   sensing the image of the imaged cells in the detected voltages in said cells,
   refreshing the cells of the photosensitive RAM to a high state while the threshold voltage is at zero
   wherein the refresh cycle takes place in the order of the photosensitive RAM access time.

6. The method as claimed in claim 5 in which the refresh cycle takes place in about 128 microseconds.

7. A series of products of the process comprising controlling dimensions of articles as conveyance is in progress by setting dimension parameters under data processor control
   said method comprising viewing a pluraliyy of articles in an optical system and successively forming images of each article,
repetitively measuring the dimensions of the articles, entering data of the dimensions of each article
creating and storing in a memory, data of the dimensions of each article,
providing a data processor with the data of the dimensions of the articles,
repetitively comparing the dimensions of the articles to create an average of the dimensions,
storing data of the average of the dimensions in said memory
monitoring conveyed articles by viewing said conveyed articles in said optical system,
ascertaining on the basis of the monitoring of the conveyed articles whether the dimensions of said articles is in accordance with said average of the dimensions,
halting the conveyance of an article when the dimensions thereof have fialed to correspond to the average of dimensions.

8. A method of checking articles for conformity of a parameter thereof with a standard parameter value, the parameter being measured optically and compared with standard parameter value using a computer, deriving a standard parameter from a plurality of parameter measurements carried out on a plurality of articles by the steps of
illuminating the plurality of articles with incident light and reflecting light from the articles,
detecting and directly entering the light into a photosensitive RAM to provide data on the measurements of the parameters in the photosensitive RAM of the articles
converting the detected light into electrical signals in the cells of the photosensitive RAM to create a binary representation of said data,
entering the electrical signals in said binary representation into a data processor containing the computer by directly reading the photosensitive RAM,
providing the data processor with this binary information of the parameters of the articles for deriving the standard parameter in a central processing unit program instructions from a programmable read only memory,
and then
illuminating in incident light additional successive articles and detecting and directly entering the light into the photosensitive RAM to provide data on said additional articles to said photosensitive RAM,
converting the detected light into electrical signals in the cells of the photosensitive RAM to create a binary representation of said data on said additional articles
entering the electrical signals in said binary representation into said data processor by directly reading the photosensitive RAM for computing in the central processing unit under program instructions from the programmable read only memory
and comparing the electrical signals in said binary representation of said data from said additional successive articles with signal representative of the standard using the central processing unit.

9. In a dimension-detecting apparatus for a control system having an object for detecting faulty dimensions which makes up part of said apparatus, said apparatus providing digital signals obtained by scanning an image optically produced from an article on a photosensitive RAM, and detecting an abnormal state of the dimensions of said article to classify the article
said apparatus comprising:
means for inspecting successive articles with illumination of a series of moving articles with incident light to provide light reflecting from the articles
the photosensitive RAM having photosensitive cells arranged so as to directly receive light from said articles and provide data on the measurements of the parameters of the articles in the photosensitive RAM, means causing the light directly received in the photosensitive RAM to be in a binary information a representation of the data on the measurements by converting the light on the cells into electrical signals
means entering the electrical signals in said binary representation into a data processor under program instructions from a programmable read only memory by directly reading the photosensitive RAM
means for detecting and accumulating binary information bits from images of a set of inspected articles by providing the data processor with the binary information for computing in a central processing unit under program instructions from the programmable read only memory to establish for the articles a state and standard with a standard deviation
and means for comparing electrical signals in binary information as a representation of inspected articles other than said set of articles with signals representative of the standard using a central processing unit.

* * * * *